(12) United States Patent
McDonald

(10) Patent No.: US 10,195,821 B1
(45) Date of Patent: Feb. 5, 2019

(54) BAMBOO LAMINATED CONSTRUCTION PANEL AND METHOD OF MANUFACTURE

(71) Applicant: BamCore LLC, Windsor, CA (US)

(72) Inventor: William D McDonald, Santa Rosa, CA (US)

(73) Assignee: Bamcore LLC, Windsor, CA (US)

( * ) Notice: Subject to any disclaimer, the term of this patent is extended or adjusted under 35 U.S.C. 154(b) by 371 days.

(21) Appl. No.: 15/212,957

(22) Filed: Jul. 18, 2016

Related U.S. Application Data

(60) Provisional application No. 62/195,296, filed on Jul. 22, 2015.

(51) Int. Cl.
| | |
|---|---|
| *B32B 7/12* | (2006.01) |
| *B32B 9/04* | (2006.01) |
| *B32B 9/02* | (2006.01) |
| *B32B 21/14* | (2006.01) |

(52) U.S. Cl.
CPC .............. *B32B 9/042* (2013.01); *B32B 7/12* (2013.01); *B32B 9/02* (2013.01); *B32B 21/14* (2013.01); *B32B 2250/04* (2013.01); *B32B 2250/40* (2013.01); *B32B 2607/00* (2013.01)

(58) Field of Classification Search
CPC .. B32B 9/042; B32B 7/12; B32B 9/02; B32B 21/14; B32B 2250/04; B32B 2250/40; B32B 2607/00
USPC ........................................................ 428/535
See application file for complete search history.

(56) References Cited

U.S. PATENT DOCUMENTS

| | | | | |
|---|---|---|---|---|
| 8,161,697 B1* | 4/2012 | McDonald | ................ | E04C 2/16 428/106 |
| 8,173,236 B1* | 5/2012 | McDonald | ............... | B27D 1/06 428/47 |
| 8,231,757 B2* | 7/2012 | Lin | .......................... | B27J 1/003 156/250 |
| 8,561,373 B1* | 10/2013 | McDonald | ................ | E04C 3/14 52/841 |
| 9,962,894 B1* | 5/2018 | McDonald | ................ | B30B 9/00 |
| 2009/0130377 A1* | 5/2009 | Samanta | ................... | C08J 5/045 428/113 |
| 2012/0070671 A1* | 3/2012 | Genz | ......................... | B32B 7/12 428/425.1 |
| 2016/0325530 A1* | 11/2016 | Slaven, Jr. | ............. | B32B 21/08 |
| 2017/0321435 A1* | 11/2017 | Chen | ....................... | B32B 5/024 |

* cited by examiner

*Primary Examiner* — Leszek B Kiliman
(74) *Attorney, Agent, or Firm* — Gary Hoenig

(57) ABSTRACT

A bamboo laminated construction panel and method of manufacture is provided wherein at least two layers of prepared bamboo are laminated together with outside surface wood veneer layers. Linear bamboo starter boards, made from timber bamboo culm cut to length, split longitudinally, processed to remove sugars, pressed flat into bamboo planks with the soft pith surfaces of two bamboo planks laminated together with grain aligned, are disposed adjacent to each other along the longitudinal side edges forming a linear bamboo starter board layer. The bamboo laminated panel is formed by laminating a first wood veneer layer with grain disposed perpendicular to the vertical centerline of the finished panel, first and second bamboo starter board layers with grains aligned opposingly and equally offset from the centerline, and a second wood veneer layer with grain also perpendicularly aligned. Additional bamboo starter board layers are optionally included in pairs to form thicker panels.

6 Claims, 5 Drawing Sheets

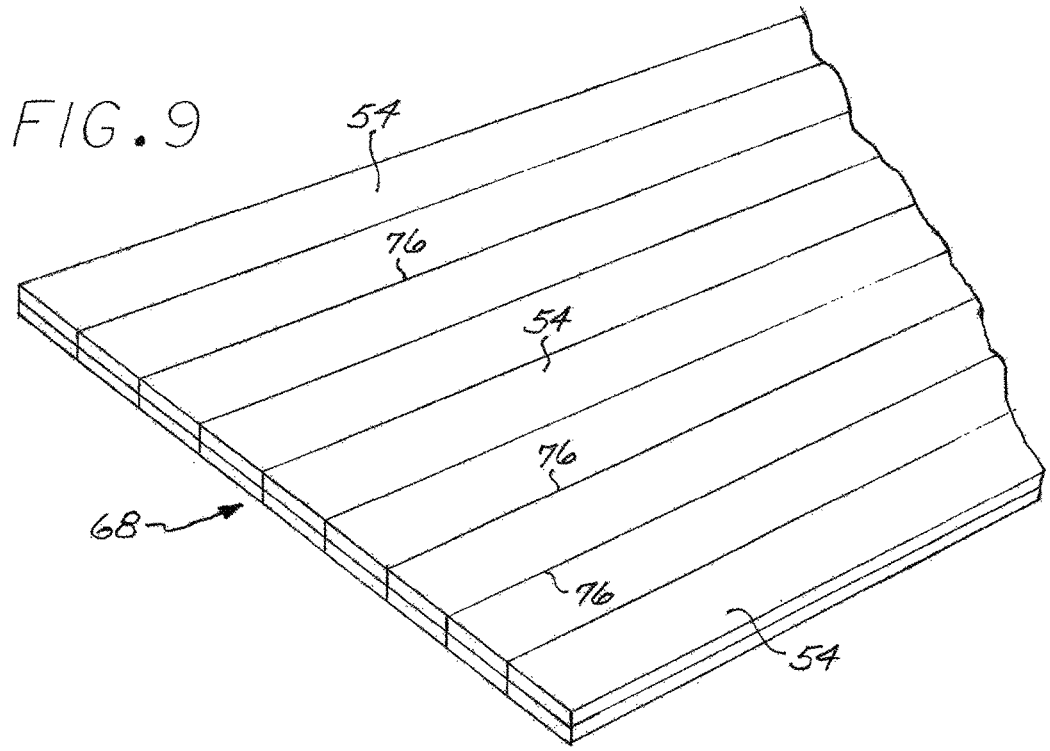
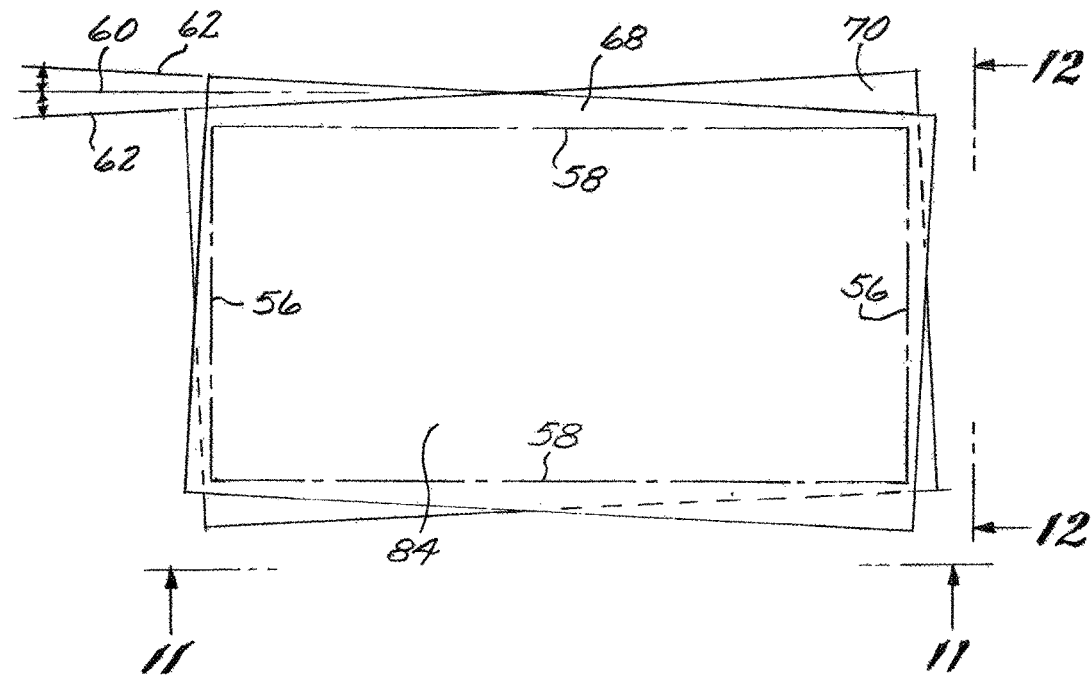

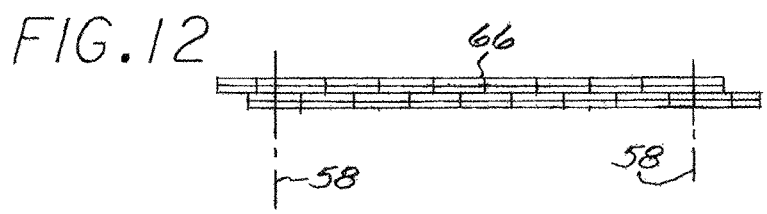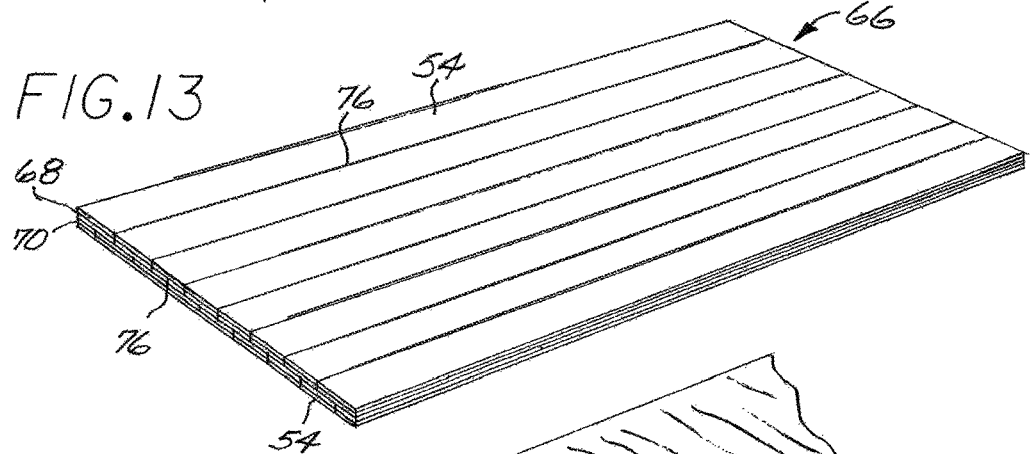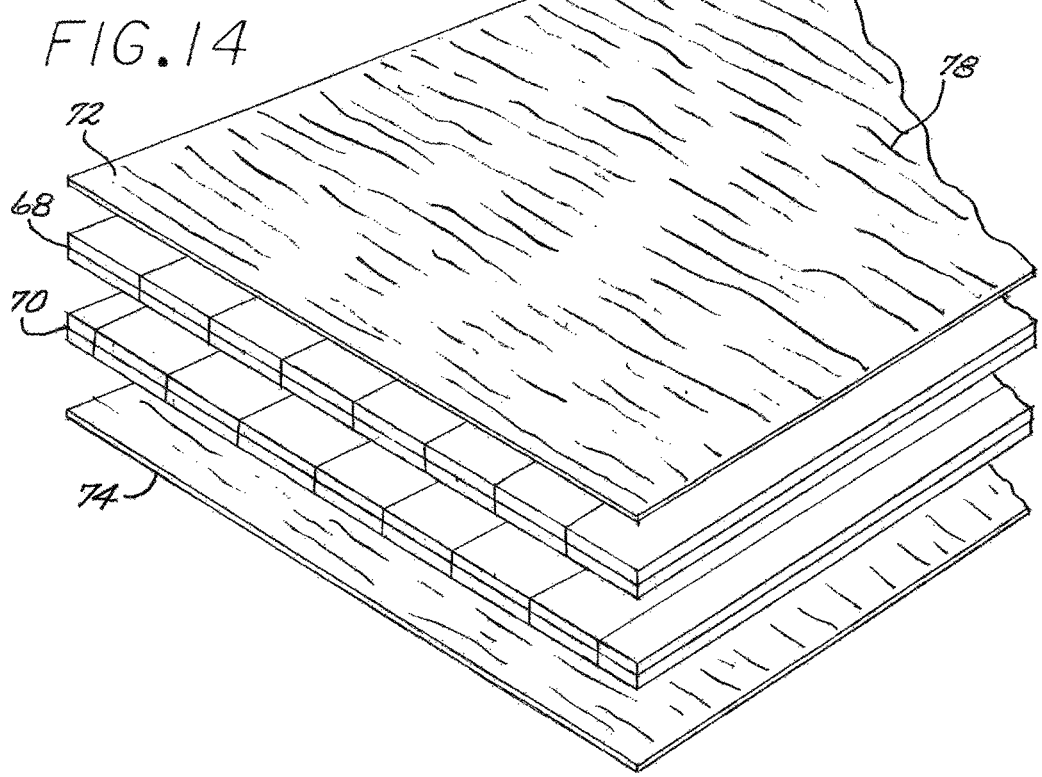

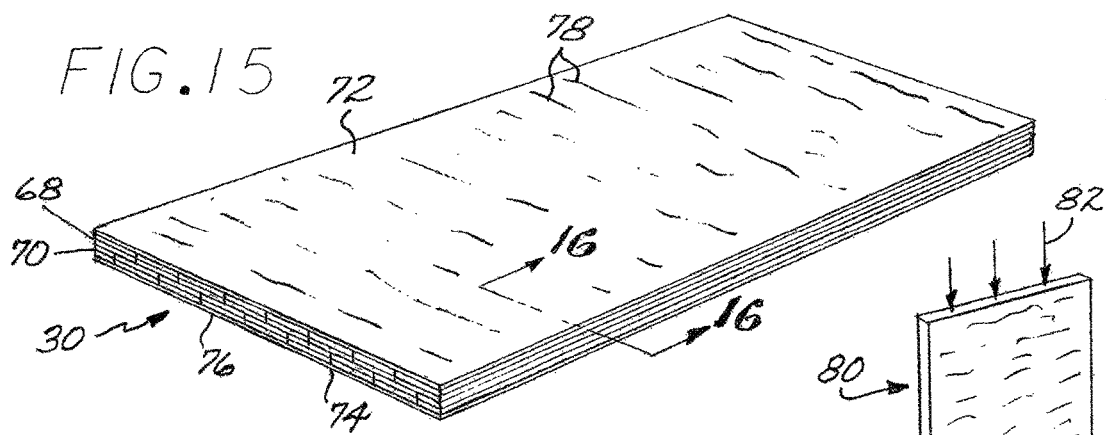
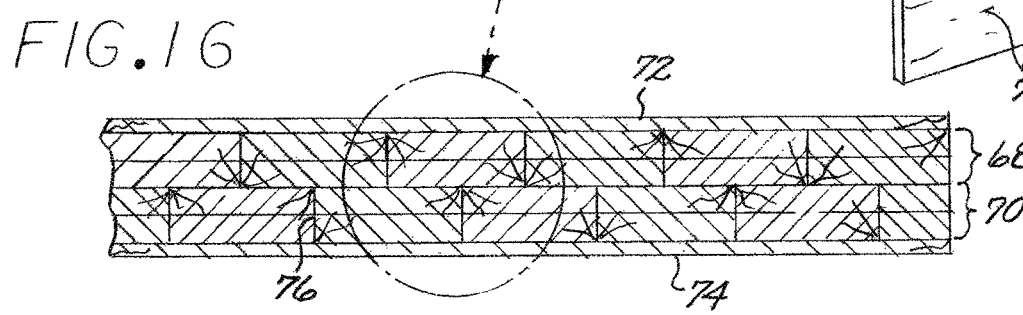
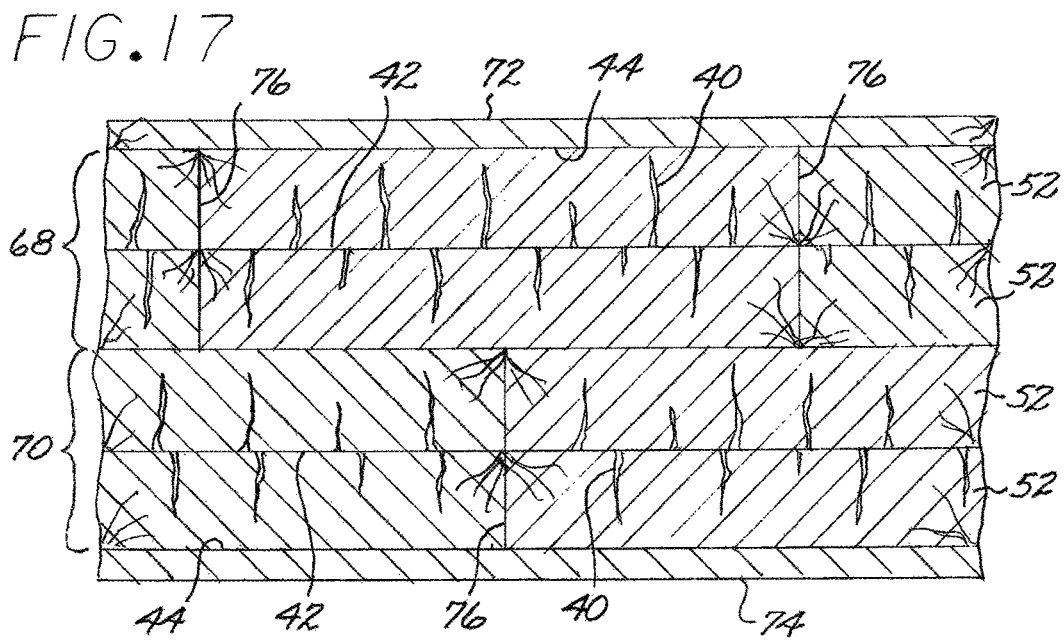

BAMBOO LAMINATED CONSTRUCTION PANEL AND METHOD OF MANUFACTURE

This non-provisional utility patent application, filed in the United States Patent and Trademark Office, claims the benefit of U.S. Provisional Patent Application Ser. No. 62/195,296 filed Jul. 22, 2015 which is hereby incorporated by reference.

FIELD OF THE INVENTION

The invention relates to the production of construction materials and, more particularly to a vertical load bearing panel comprising bamboo as the principal element.

BACKGROUND OF THE INVENTION

Bamboo is a prolific woody grass that has long been used in various forms as a construction material. Bamboo possesses numerous properties advantageous to the construction industry. Of particular utility is the high vertical compression strength when used in pole form, also referred to as bamboo cane, as a vertical support member or load bearing element in a structure.

Traditional wood based home building techniques typically include the use of stick lumber, sheeting, panels, beams, trusses, engineered lumber products and other components fashioned from wood in the form of lumber, laminated elements and panels. Consequently the demand for wood is high requiring harvesting rates often exceeding the replenishment rates. Timber bamboo, being a grass, is prolific throughout the world and as a construction material has many advantages over wood including material cost, strength, rapid growth, high carbon sequestration and sustainability making timber bamboo an attractive substitute for wood. Use of timber bamboo as a wood replacement is highly desirable; however, the dimensional format of timber bamboo limits the use as a direct substitute. Consequently the use of bamboo cane, in its natural form as a replacement for traditional wood products, has been limited by inconsistency of cane sizes and structural variations requiring parsing and selection for diameter, length and wall thickness to satisfy structural specifications for each application. Additionally, the inconsistent shapes and dimensions of bamboo cane are difficult and costly to incorporate in the construction of most traditional buildings. Consequently, other methods of using bamboo present in the prior art are principally directed towards utilizing bamboo to replace wood in composite materials such as plywood, panels, or boards wherein the bamboo is shredded, cut into strips, wafers, or chips typically having the size and shape of the equivalent wood material. The portion of the bamboo that most closely mimics the equivalent wood material is the cellulose fibers and vascular components present in the outer portions of the bamboo culm where the density of the fibers and vascular components are high relative to a surrounding lignin natural polymer binder. Typically, the outer third portion of the culm is harvested, discarding the remainder, and shredded or crushed into wafers, chips, strands, flakes or other small shapes that are, in turn, bound together with resins and formed into board such as oriented strand board (OSB). These processes permit manufacturing finished construction materials utilizing bamboo and having consistent and predictable dimensions and structural characteristics. Composite products formed in this matter necessarily break the lignin, the natural bonding material, and then are re-bonded with resin consequently losing a significant portion of the structural characteristics of a bamboo cane. In particular, breaking the natural lignin polymer bonds and re-bonding with resin significantly adds to the weight and cost of the finished material as compared to the weight and cost of the equivalent volume of raw bamboo. Further, and most importantly, the natural high vertical compression strength structure of the bamboo cane is lost.

Regarding panel construction, panel systems typically include vertical stud or post members with sheeting forming the vertical surfaces wherein the sheeting provides a surface and sheer strength. As the sheeting, typically OSB or similar material, has low vertical compression strength, the vertical studs or posts are necessary to provide vertical load bearing. The studs and posts unfortunately provide a thermal bridge between the panel sheets thereby reducing the R value of a panelized wall. Further the studs and posts provide obstructions to the installation of utilities in a panelized wall. What is needed is a high vertical load bearing sheeting element thereby eliminating the need for studs or posts. Wood based sheet products typically are incapable of sustaining the loads. Cane timber bamboo is suitable but dimensionally incompatible.

Utilizing bamboo as a replacement for wood in vertical load bearing construction materials has been problematic. However, bamboo has many advantages over wood as a raw material. Bamboo is generally lower cost than wood. Bamboo is fast growing requiring only 3 to 4 years before harvesting as timber grade bamboo, a growth time significantly less than wood. As compared to wood, bamboo has a higher rot resistance and resistance to insect infestation than most woods in North American climates. Further, bamboo has a higher level of carbon sequestration than most woods. Therefore, what is needed is an improved load bearing construction material principally utilizing bamboo while maintaining the bamboo culm structure largely in tact thereby capitalizing on the advantageous characteristics of timber bamboo while providing a material with substantially consistent and predictable dimensions and structural characteristics such as timber or other load bearing structural components.

SUMMARY OF THE INVENTION

Accordingly, the present invention is directed to a grass based panel manufactured from timber bamboo, a prolific, fast growing, sustainable and renewable plant. The timber bamboo based panel according to the present invention is formed by laminating processed bamboo planks prepared from harvested and dried timber bamboo canes cut from three year or older timber bamboo culm. The culm is cut to convenient length canes, the leaves are removed, the cane is split lengthwise into equal halves, the interior nodes are removed, the sugars are leached out, the prepared halves are dried then pressed flat into planks, and the planks are planed to a preselected thickness with the soft inner pith surface preferentially planed to minimize removal of fiber from the hard outer cortex surface.

The bamboo planks are laminated together with the soft inner pith sides facing each other to form a bamboo starter board. With the grains of the planks aligned longitudinally and parallel to each other, a linear bamboo starter board is formed. The linear bamboo starter boards sides are trimmed parallel to each other to the maximum width achievable whilst maintaining continuity of the material thereby minimizing waste. The linear bamboo starter boards are now arranged with the sides adjacent to each other forming a first layer. A second layer of linear bamboo starter boards is similarly arranged. The bamboo laminated panel according to the present invention is formed by laminating the bottom of a first wood veneer layer to the top surface of the first linear bamboo starter board layer, the bottom of the first starter board layer being laminated to the top of the second starter board layer and the top of a second wood veneer layer to the bottom of the second starter board layer. The laminated layers are next trimmed to preselected finished dimensions which are typically four foot widths and lengths of eight or ten feet. The panels are trimmed in a manner to maintain a continuous linear bamboo starter board within the length of the panel thereby providing a continuous linear bamboo starter board from the top to bottom of a vertically disposed finished panel. The orientation of the grain of each layer of the panel is critical to provide sufficient vertical load capacity and sheer strength of the finish panel. The first and second linear bamboo starter board layers are each disposed with the longitudinal grain opposingly offset by two to twelve degrees, preferably three degrees, from the longitudinal or vertical centerline of the finished panel. Also, the first and second wood veneer layers are disposed with the grain perpendicular to the vertical centerline of the finished panel.

An objective of the present invention is to provide a high vertical load carrying capacity panel. The bamboo laminated panel, when manufactured in sheet form and utilized within a structure and positioned vertically, behaves similar to a wide and thin post or stud bearing load along the top edge of the panel. In this arrangement, the linear bamboo starter boards exhibit load bearing characteristics similar to the bamboo cane from whence they were formed. Consequently, the bamboo laminated panel demonstrates vertical load bearing strengths and capabilities far exceeding equivalently dimensioned wood based products thereby facilitating studless wall construction.

Another objective of the present invention is to provide a panel suitable for construction. The bamboo laminated panel provided exceeds wood based panel vertical load bearing capacities. Sheer strength is provided by the offset longitudinal alignment of the linear bamboo starter board layers in combination with horizontal grain orientation of the wood veneer layers.

Other advantages of the bamboo laminated panel include the fact that dimensional changes are minimal relative to soft wood and OSB products because bamboo is a hardwood. Noting that traditionally built wall structures typically utilize load bearing structural components, such as timber, for sustaining vertical loads and plywood or gypsum board for the vertical surfaces, the bamboo laminated panel may be used as a substitute to replace both the timber load bearing components as well as the plywood or gypsum board elements thereby significantly reducing the cost of material and construction of traditionally built structures.

An objective of the invention is to provide a dimensionally equivalent substitute for wood based sheeting. The objective is accomplished by harvesting timber bamboo cane in lengths exceeding the desired height of the finished bamboo panel, and planing the bamboo culm halves to a preselected thickness wherein the assembled bamboo laminated has a thickness of dimensional wood based sheeting. Continuous bamboo plank elements along the full length of the bamboo laminated panel are essential to maintain the compression strength characteristics of the panel. Additional thickness may optionally be achieved by inserting additional pairs of linear bamboo starter board layers. Maintaining symmetry of the laminated layers is critical to provide dimensional and load performance stability of the panel.

Being a prolific fast growing grass with high carbon sequestration, bamboo provides significant sustainability and renewability thereby providing advantages over wood as a construction material. Additionally harvesting and processing timber is cost efficient. In combination with the dimensional and performance equivalence to wood products, the bamboo laminated panel of the present invention overcomes many of the disadvantages of the prior art.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 9 is a perspective view of a first layer of linear bamboo starter boards of the bamboo panel according to the present invention illustrating the first layer comprising a plurality of bamboo starter boards aligned longitudinally and adjacently to the respective vertical sides.

FIG. 10 illustrates the disposed longitudinal offset alignment of a second linear bamboo starter board layer relative to the opposingly offset first linear bamboo starter board layer and the longitudinal center line of the central portion of a bamboo laminated panel.

FIG. 11 is a side elevation view taken along Line 12-12 of FIG. 10 of the central portion of a bamboo laminated panel noting the trim lines where the central portion is cut to a selected finished length of the bamboo laminated panel.

FIG. 12 is an end elevation view taken along Line 12-12 of FIG. 10 of the central portion of a bamboo laminated panel noting the trim lines where the central portion is cut to a selected finished width of the bamboo laminated panel.

FIG. 13 is a perspective view of the assembled and trimmed central portion of the bamboo laminated panel according to the present invention.

FIG. 14 is an expanded perspective view of the end of the bamboo laminated panel illustrating top and bottom veneer elements with the first and second linear bamboo starter board layers disposed between.

FIG. 15 is a perspective view of the assembled bamboo laminated panel according to the present invention.

FIG. 16 is a cross sectional view taken along Line 16-16 of FIG. 15 showing the placement of the junctions between the linear bamboo starter boards of the first and second linear bamboo starter board layers wherein the junctions of the first layer are not aligned with junctions of the second layer.

FIG. 17 is an inset view at 17 in FIG. 16 illustrating the resulting disposition of hard and soft bamboo plank surfaces within the bamboo laminated panel according to the present invention.

FIG. 18 is a perspective view of the assembled bamboo laminated panel according to the present invention arranged vertically and illustrating a typical load vector applied to the top edge and vertical axis of the bamboo laminated panel when utilized as a structural building component.

DETAILED DESCRIPTION OF THE INVENTION

Figure 1:
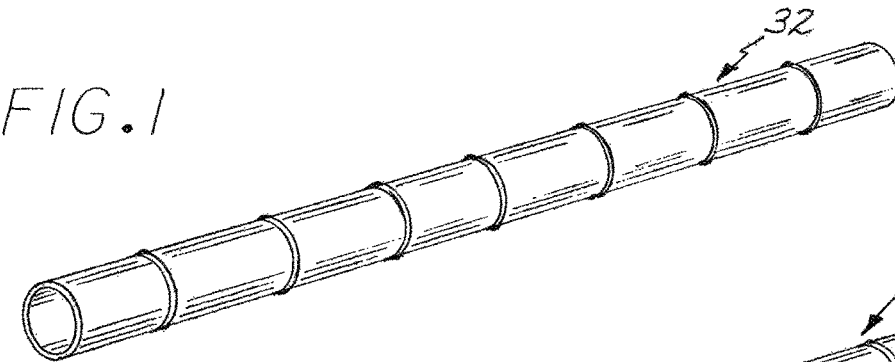
FIG. 1 is a perspective view of the bamboo cane cut from a timber bamboo culm according to the present invention and product of the first step of the manufacturing process.

Although particular embodiments of the invention have been described in detail for purposes of illustration, various modifications may be made without departing from the spirit and scope of the invention. As used herein, the term "wood" refers to tree based material as distinguished from bamboo, which is grass based. Where examples are presented to illustrate aspects of the invention, these should not be taken as limiting the invention in any respect.

Now referring in greater detail to the various figures of the drawings wherein like reference characters refer to like parts, there is shown in FIG. 15, is a first embodiment of the present invention, a bamboo laminate panel, shown at 30, suitable for use as dimensional construction panel having structural characteristics and specifications meeting or exceeding wood based products of similar dimensions. The bamboo laminated panel comprises layers of pressed continuous bamboo culm halves and outer wood veneer layers laminated together to form a dimensional construction panel having high vertical load bearing capacity.

Figure 2:
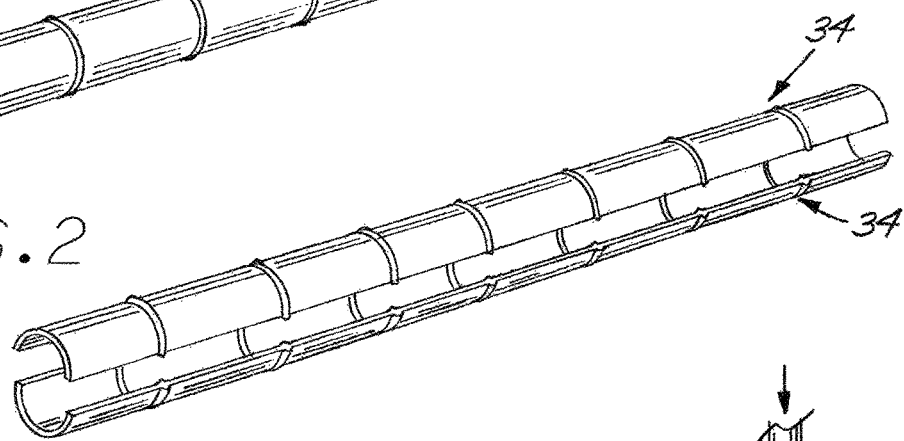
FIG. 2 is a perspective view of the bamboo pole of FIG. 1 wherein the cane is cut longitudinally along the centerline of the cane forming two equal halves.
Figure 3:
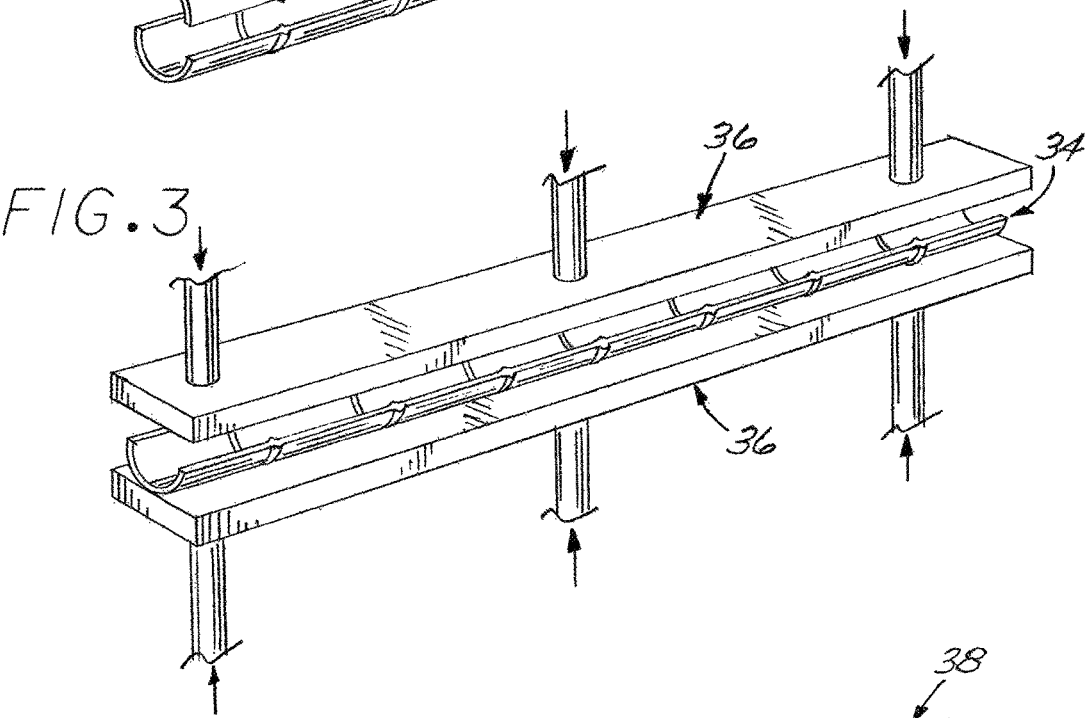
FIG. 3 is a perspective view of a half cane element of FIG. 2 disposed within a press.
Figure 4:
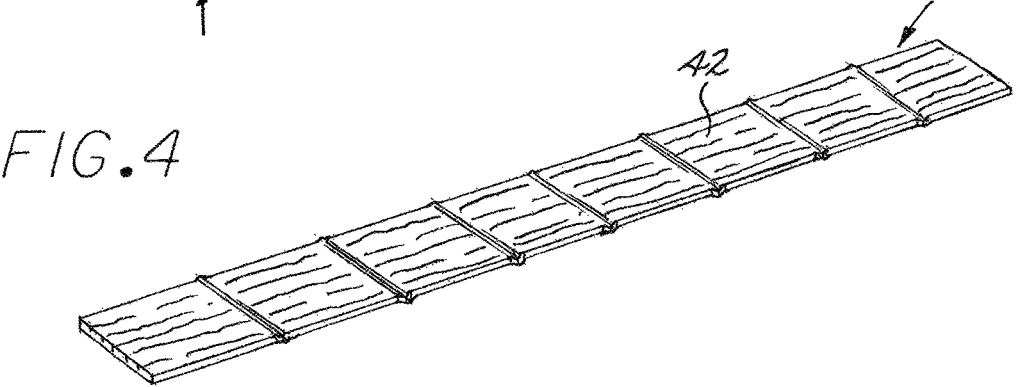
FIG. 4 is a perspective view of a bamboo plank being the bamboo cane half section of FIG. 3 after being pressed illustrating the longitudinal fissure elements in the surface of the plank.
Figure 5:
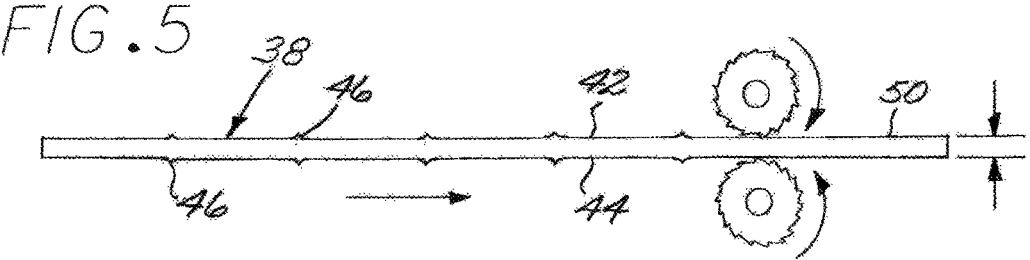
FIG. 5 is a side elevation view of the bamboo plank being planned to a predetermined thickness wherein material is preferentially removed from the pith side of the plank.

Referring to FIG. 1, the bamboo laminate lumber according to the present invention is formed from timber bamboo canes 32 cut from timber bamboo culms being at least three years old and having at least a 6 inch diameter. The bamboo canes 32 are cut longitudinally along the centerline into equal bamboo cane halves 34 as shown in FIG. 2 wherein the nodes are removed. The bamboo cane halves 34 are processed to remove sugars. The bamboo cane halves 34 are next individually pressed flat uniformly along the length of the bamboo cane half 34 utilizing a hydraulic press 36 wherein the softer pith surface 42 acquires longitudinally oriented fissures 40 along the grain. As the majority of the fibers are longitudinally parallel in timber bamboo, unlike wood, the fissures 40 created during the pressing process follow the grain of the bamboo whilst minimizing damage to the fibers thereby maintaining the inherent strength characteristics of natural bamboo. The process yields a flatten bamboo cane half 38 as illustrated in FIG. 4. The fiber density in the bamboo culm is higher in the regions near the cutaneous outer cortex surface 44. Hence, the flattened bamboo cane half 38 is preferentially planed to a suitable thickness in a manner to preserve the fiber adjacent to the cortex surface. The planing step also removes protruding node material 46 as shown in FIG. 5.

Figure 6:
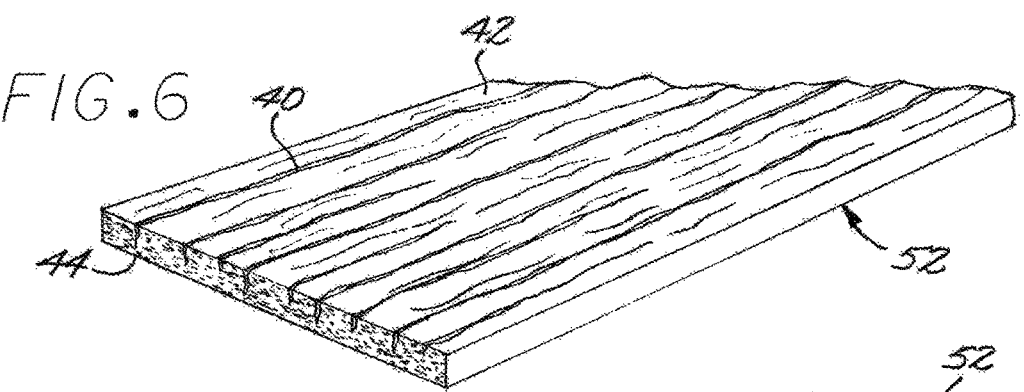
FIG. 6 is a perspective view of the end of the planed bamboo plank of FIG. 5 showing the hard cutaneous surface being the bottom and the soft pith surface, being the top.

The processed and planed flattened bamboo cane half 50 is now the bamboo plank 52 of FIG. 6 wherein the upwardly facing surface 42 is the inner pith surface of the bamboo culm and is characterized by the longitudinal surface fissures 40 and a lower fiber density than the downwardly facing cortex surface possessing a significantly high fiber density. Consequently the upper surface is relatively softer than the lower surface 44.

Figure 7:
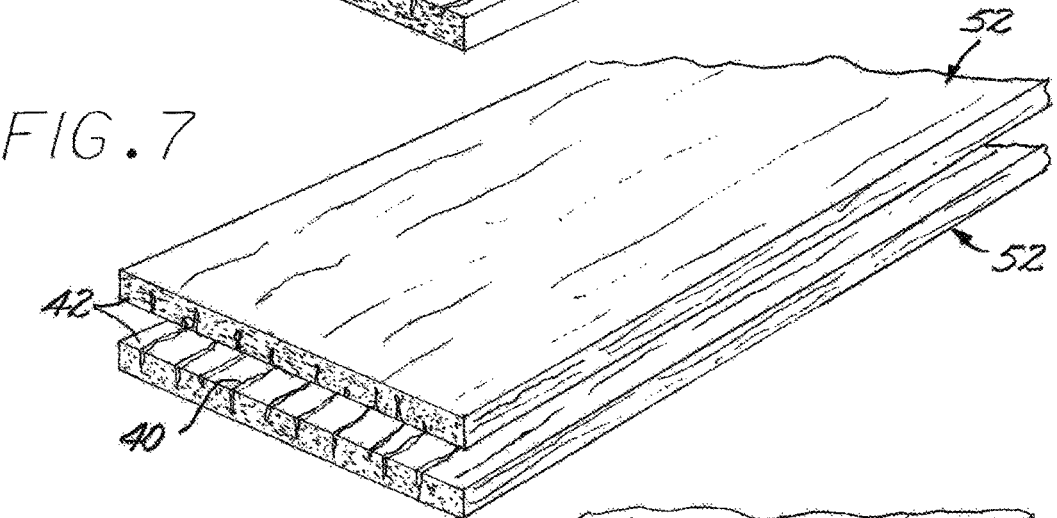
FIG. 7 is an expanded perspective view of the end of a bamboo board comprising two planed bamboo planks disposed parallel with each other and having the soft pith sides facing each other.
Figure 8:
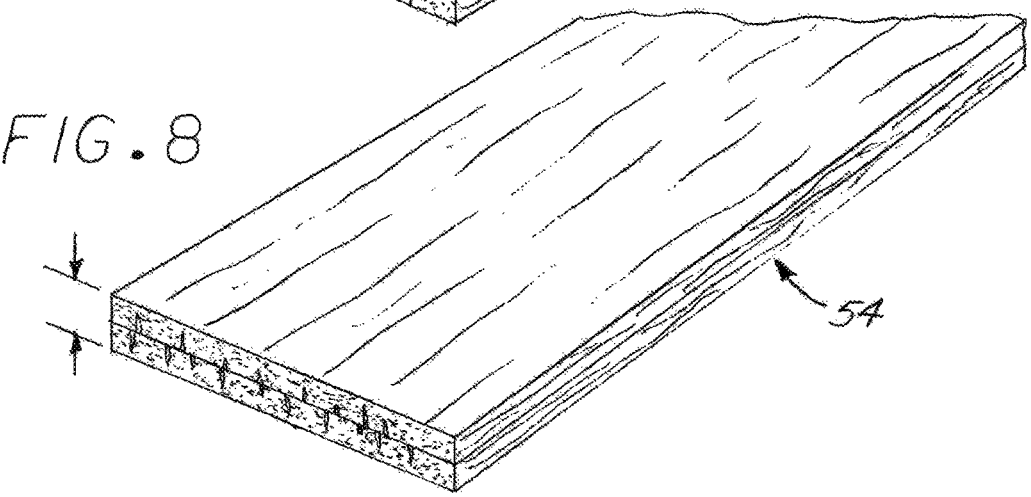
FIG. 8 is a perspective view similar to FIG. 7 illustrating the assembled bamboo starter board.

In order to maximize the strength characteristics and stability of the finished bamboo laminated panel 30, it is important to arrange the orientation of the various hard and soft sides of the bamboo planks 52 in a specific order of assemblage. Referring now to FIG. 7, two bamboo planks 52 are arranged with the soft sides 42 facing each other. A suitable adhesive is provided between the two planks 52 and the resulting laminated element being a linear bamboo starter board 54 is created and illustrated in FIG. 8. As the lignin content is higher on the inner soft surface many adhesive provide a lower binding strength, consequently the fissures 40 of the planks are an important feature providing keys for the adhesive. Note that this is a linear bamboo starter board 54 as the longitudinal grain of the two bamboo planks 52 is parallel aligned. It will be appreciated that the finished dimensional thickness of the linear bamboo starter board 54 is predetermined by the thickness established during planing of the flattened bamboo halves 50 as in FIG. 5. The width of the linear bamboo starter board 54 is not critical therefore the longitudinal edges being parallel to each other should be trimmed to minimize waste.

Linear bamboo starter boards 54 are aligned with the longitudinal edges abutting each other as shown in FIG. 9. Adhesive is provided within these butt joints 76. The number of linear bamboo starter boards 54 aligned is determined by the finished bamboo laminated panel width. The aligned and abutted linear bamboo starter boards form a linear bamboo starter board layer.

As illustrated in FIG. 10, a first linear bamboo starter board layer 68 is disposed over a second linear bamboo starter board layer 70. The longitudinal grain of the layers are oriented at an offset angle 62 from the longitudinal vertical centerline 60 of the finished bamboo laminated panel dimensions 84. The first linear bamboo starter board layer is disposed at an offset angle 62 from the centerline 60 whilst the second bamboo starter board layer is disposed at an opposing and equal offset angle 62 on the opposing side of the centerline 60. The offset angle 62 is in the range of two to twelve degrees. Symmetry must be maintained in order to minimize warpage, maintain dimensional stability, and uniform structural characteristics of the finished panel. The layers are laminated together utilizing an adhesive forming the center portion 66 of the panel. It will be appreciated that the length and width of the linear bamboo starter board layers must equal or exceed the preselected dimensions 84 of the finished panel thereby providing material to cut the length end trim cuts 56 and width side trim cuts 58 as illustrated in FIGS. 11 and 12.

Referring now to FIG. 13 showing the central portion 66 of the panel, it is important that the first 68 and second 70 linear bamboo starter board layers be arranged to avoid coinciding alignment with the butt joints 74 so as to avoid weak points in the finished panel.

An exploded view of the various layers of the bamboo laminated panel 30 is illustrated in FIG. 14 and shows a first wood veneer layer 72 with the grain 78 oriented perpendicular to the longitudinal vertical centerline 60 of the finished panel positioned above the first linear bamboo starter board layer 68. A second wood veneer layer 74 is similarly positioned with the same grain 78 orientation below the second linear bamboo board starter layer 70. The grain orientation of the wood veneer layer is important to dimensionally stabilize the finished panel and to provide additional sheer strength. Other veneer materials may optionally be utilized; however, the wood veneer provides a well accepted and traditional visual appearance as well as providing a surface with well establish and proven binding characteristics so as to confidently and reliably accept surface treatments.

The layers are laminated together with adhesive yielding the bamboo laminated construction panel 30 of FIG. 15. It will be appreciated that additional first and second linear bamboo starter board layers may optionally be included in the panel layup to provide additional thickness to the finished panel; however, the additional linear bamboo starter board layers must be added in pairs and aligned with the same opposing offset angles in order to maintain symmetry and stability of the finished panel.

As discussed, the orientation and arrangement of the various elements of the bamboo laminated panel 30 is critical. In FIGS. 16 and 17, showing details of the top end of the panel, note that the butt joints 76 within the linear bamboo starter board layers 68 and 70 do not align. Note also that in the final assembly that the soft pith surfaces 42 of the bamboo planks 52 are laminated to each other and that the fissures 40 of the soft pith surface 42 of the bamboo planks 52 provide keys for the adhesive for laminating the soft pith sides 42 together. The symmetric orientation of a harder cortex surface 44 having a higher fiber count on either side of the centrally bonded lower fiber density soft pith surface 42 provides structural characteristics analogous to a natural flattened bamboo cane, including dimensional stability and maximization the strength and durability of natural bamboo.

Any suitable adhesive may be used to laminate the various elements of the bamboo laminated panel together as long as ASTM certification is achievable when used with wood and bamboo. The bamboo laminated panel can be made environmentally friendly if non-formaldehyde emitting compounds are used as the inherent quantity of formaldehyde in bamboo is insignificant. Timber bamboo is preferred; however, any bamboo having straight culms, adequate wall thickness, and certifiable adhesion binding characteristics may be used. Any wood may be utilized for the wood veneer layers; however, douglas fir has demonstrated adequate performance and is readily available.

When utilized as a construction panel element in a structure the finished panel is oriented vertically with the wood veneer grain 78 now horizontally as shown in FIG. 18 at 80, the bamboo laminated construction panel now exhibits vertical compression strengths meeting or exceeding the characteristics of natural bamboo. Consequently, the vertically disposed panel is capable of receiving high vertical load vectors 82 along the top edge at levels substantially exceeding wood based products of equivalent dimensions. The skewed layup of the panel further provides sufficient sheer strength to negate the need for specially built sheer walls. Yet further, the layup also eliminates the need for most headers. The bamboo laminated panel 30 in completed form thusly provides a dimensionally stable and high strength superior replacement for vertical load bearing structural components as well as a low cost, sustainable, and green substitute for conventional wood based products.

I claim:

1. A bamboo laminated construction panel comprising layers of wood veneer and linear bamboo starter boards laminated together with an adhesive forming the panel having a longitudinal vertical centerline, the layers being
   a first wood veneer layer having top and bottom surfaces and a longitudinal grain, the first wood veneer layer being disposed with the longitudinal grain oriented perpendicular to the longitudinal vertical centerline of the panel,
   a first bamboo starter board layer, having top and bottom surfaces and a longitudinal grain, disposed with the top surface adhered to the bottom surface of the first wood veneer layer,
   a second bamboo starter board layer, having top and bottom surfaces and a longitudinal grain, disposed with the top surface adhered to the bottom of the first bamboo starter board layer; and,
   a second wood veneer layer having top and bottom surfaces and a longitudinal grain, disposed with the top surface adhered to the bottom surface of the second bamboo starter board layer with the longitudinal grain oriented perpendicular to the longitudinal vertical centerline of the panel.

2. The bamboo laminated construction panel of claim 1 wherein the bamboo starter board layer comprises a plurality of linear bamboo starter boards each having a longitudinal edges disposed with the longitudinal edges adjacent to and adhered to each other, each linear bamboo starter board further comprising two flattened and planed timber bamboo cane halves each having a longitudinal grain, an inner pith surface and a cutaneous outer cortex surface, being laminated together with the inner pith surfaces adjacent and longitudinal grain aligned.

3. The bamboo laminated construction panel of claim 1 wherein the first bamboo starter layer is arranged with the longitudinal grain disposed offset at a preselected angle from the longitudinal vertical centerline of the panel and the second bamboo starter layer is arrange with the longitudinal grain disposed opposingly offset at the same preselected angle from the longitudinal vertical centerline of the panel.

4. The bamboo laminated construction panel of claim 3 wherein the preselected angle is selected from the range of 2 to 12 degrees.

5. The bamboo laminated construction panel of claim 1 wherein at least one linear bamboo starter board layer is interposed between the first linear bamboo starter board layer and the second linear bamboo starter board layer.

6. The bamboo laminated construction panel of claim 1 wherein the wood veneer layer is douglas fir.

* * * * *